United States Patent
Duffield

(10) Patent No.: US 7,874,148 B2
(45) Date of Patent: Jan. 25, 2011

(54) REGENERATION SYSTEM AND METHOD FOR PARTICULATE TRAPS

(75) Inventor: Kendall Thomas Duffield, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 112 days.

(21) Appl. No.: 11/686,503

(22) Filed: Mar. 15, 2007

(65) Prior Publication Data

US 2008/0223340 A1  Sep. 18, 2008

(51) Int. Cl.
*F01N 3/00* (2006.01)
(52) U.S. Cl. .............................. 60/297; 60/280; 60/286; 60/293; 60/295; 60/303; 239/106; 239/109; 239/112; 239/125
(58) Field of Classification Search .................... 60/297, 60/280, 293, 295, 303, 307, 274, 286, 289, 60/290, 301; 239/104, 106, 108, 109, 112, 239/113, 125
See application file for complete search history.

(56) References Cited

U.S. PATENT DOCUMENTS

| | | | |
|---|---|---|---|
| 4,215,549 A | 8/1980 | Daeschner | |
| 4,356,696 A | 11/1982 | Mason | |
| 4,987,738 A * | 1/1991 | Lopez-Crevillen et al. | .... 60/286 |
| 5,884,475 A * | 3/1999 | Hofmann et al. | ............... 60/274 |
| 5,979,160 A * | 11/1999 | Yashiki et al. | ................. 60/276 |
| 6,021,639 A * | 2/2000 | Abe et al. | ...................... 60/297 |
| 6,293,097 B1 * | 9/2001 | Wu et al. | ........................ 60/286 |
| 6,470,673 B1 * | 10/2002 | van Nieuwstadt et al. | ..... 60/274 |
| 7,337,607 B2 * | 3/2008 | Hou et al. | ...................... 60/274 |
| 7,571,599 B2 * | 8/2009 | Hirata | .......................... 60/286 |
| 2005/0252201 A1 * | 11/2005 | Lecea et al. | ................... 60/286 |
| 2006/0101810 A1 * | 5/2006 | Angelo et al. | ................. 60/286 |
| 2007/0271918 A1 * | 11/2007 | Nishiyama et al. | ............ 60/600 |
| 2008/0016849 A1 * | 1/2008 | McCarthy et al. | ............. 60/286 |
| 2008/0034733 A1 * | 2/2008 | Miller et al. | ................... 60/286 |

FOREIGN PATENT DOCUMENTS

| | | |
|---|---|---|
| DE | 10 2004 048 335 A1 | 4/2006 |
| JP | 60073009 | 4/1985 |

OTHER PUBLICATIONS

European Search Report dated Sep. 4, 2009 for Application 08102519.9-1263/1970544.

* cited by examiner

*Primary Examiner*—Binh Q. Tran

(57) ABSTRACT

An internal combustion engine system has an internal combustion engine with an intake for air and an exhaust for products of combustion. The engine has a turbocharger for pressurizing intake air in response to passage of the products of combustion. An exhaust aftertreatment device receives the exhaust from the engine to filter diesel particulates. A device for regenerating the exhaust aftertreatment device has a feed line and nozzle for injecting duel upstream of the exhaust aftertreatment device on a periodic basis. A system and method for purging the fuel line and the nozzle utilizes pressurized air from the engine turbocharger via an air tank when the regenerating device is not injecting fuel.

10 Claims, 1 Drawing Sheet

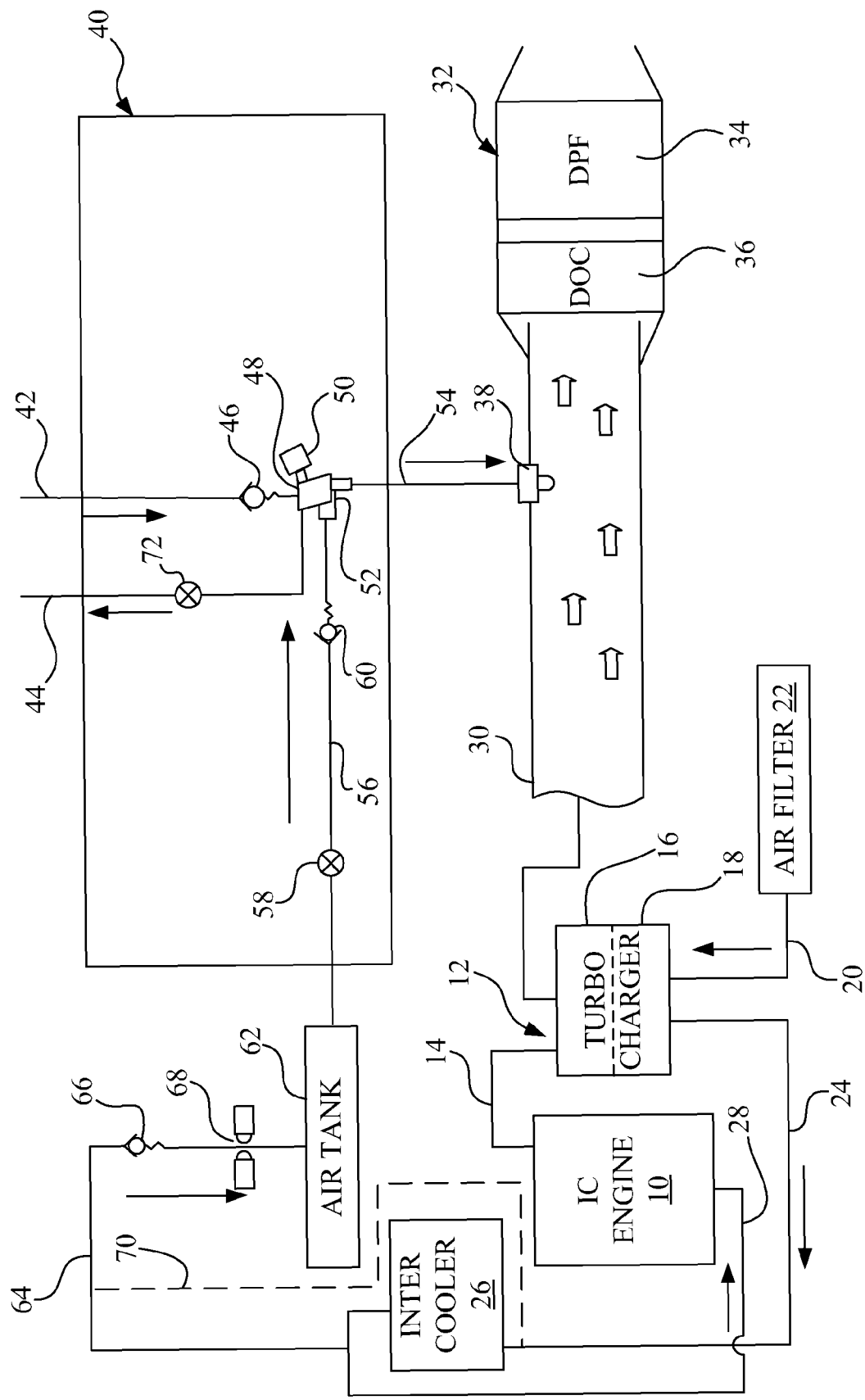

REGENERATION SYSTEM AND METHOD FOR PARTICULATE TRAPS

FIELD OF THE INVENTION

The present invention relates to internal combustion engine systems and more particularly systems for regenerating diesel particulate traps.

BACKGROUND OF THE INVENTION

The diesel engine has been used for commercial, industrial, agricultural and other heavy duty applications for well over 100 years. The fundamental diesel engine cycle promotes high part-power fuel efficiency and has therefore become the engine type of choice for commercial and agricultural purposes. Although the diesel engine has outstanding efficiency and long term durability, environmental issues have increased in significance with substantial increases in urban populations throughout the world. Nowhere is this force more evident than in the United States, beginning with the Environmental Protection Agency (EPA) established over 30 years ago. During the ensuing years, the EPA has proposed and adopted ever increasing emissions limits for on-highway vehicles. The application of these standards has now been applied to off-road vehicles such as tractors, combines and other vehicles not normally driven on public highways including power generation systems. The EPA has adopted successive tiers of emissions requirements and the most recent is Tier IV. This requirement necessitates a diesel particulate filter (DPF) along with a requirement for regeneration of the filter to remove particulate matter accumulated on the filter.

A number of systems have been proposed to regenerate filters, relying on the fact that diesel particulate matter combusts when local temperatures are above 600° C. These systems may include engine management, resistive heating coils, microwave generation, and a fuel burner to increase the exhaust temperature. Another system is hydrocarbon injection in the form of atomized fuel upstream of a catalytic oxidizer to increase the exhaust temperature around the filter. One of the problems with such a system is that the fuel nozzle and lines leading to the nozzle are subjected to high ambient temperatures reaching into the region where the hydrocarbon fuel tends to coke and form deposits in the fuel nozzle and associated supply passages.

The solution to this problem for heavy duty on-highway vehicles is to blow out the line with compressed air from the standard air brake system supply tank, usually at around 100 pounds per square inch (psi). While the system is feasible for highway diesel propulsion systems it is not available for off-highway agricultural equipment which typically does not use compressed air as a power source for an air brake system.

Thus, there exists a need in the art for a regeneration system that employs a purging process with compressed air from a source other than a dedicated pump and reservoir for compressed air.

SUMMARY OF THE INVENTION

In one form, the above objects are met by an internal combustion engine system including an internal combustion engine having an intake for air and an exhaust for products of combustion. A device pressurizes air for delivery to the engine intake for combustion. An exhaust aftertreatment device receives the exhaust from the engine. A regeneration device for the exhaust aftertreatment device has a feed line and nozzle for injecting fuel upstream of the exhaust aftertreatment device on a periodic basis. A system for purging the fuel line and the nozzle utilizes air from the intake air pressurizing device when the generating device is not injecting fuel.

In another form, the above objects are met a method for purging fuel lines and nozzle in a fuel driven regeneration device for an internal combustion engine having a device for pressurizing air for delivery to the engine. The method includes the steps of:
  extracting air from said air pressurization device,
  storing said extracted pressurized air in a storage tank, and
  releasing said air to said fuel lines when the fuel lines are not receiving fuel for said regeneration.

BRIEF DESCRIPTION OF THE DRAWINGS

FIG. 1 shows a schematic representation of an internal combustion engine system embodying the present invention.

DETAILED DESCRIPTION OF THE INVENTION

FIG. 1 shows an internal combustion engine system including an engine 10, herein illustrated as being of the diesel type, in which the heat of compression ignites a fuel charge to produce a propulsive force that is translated through connecting rods and crankshaft to a rotary output. The internal combustion engine has a fuel system (not shown) that provides timing and quantity control of the fuel charge to produce appropriate power, fuel efficiency, and emissions levels. The internal combustion engine is coupled with a turbocharger 12 by means of an exhaust connection 14. The turbocharger 12 has a turbine section 16 that receives products of combustion from engine 10 via line 14 to produce a rotary output which is used to drive a compressor section 18 to pressurize inlet air from line 20 and air filter 22. The pressurized air is discharged from compressor 18 via line 24 to an intercooler 26. Intercooler 26 receives the air that has been heated by the compressor 18 and cools it to increase the charge density. Intercooler 26 may be of the air-to-air or air-to-coolant type as appropriate for the particular application. The cooled output from intercooler 26 is fed by line 28 to the intake of engine 10 where it is consumed by the engine in standard fashion.

The output from the turbine 16 of turbocharger 12 is fed by exhaust line 30 to an exhaust aftertreatment device generally indicated by reference character 32. The exhaust aftertreatment device 32 includes a diesel particulate filter 34 (DPF) that filters particles from the exhaust flowing through line 30. One of the characteristics of the diesel particulate filter is that it continues to collect particles until a point where the pressure drop across the diesel particulate filter increases to necessitate regeneration of the particle filter. The particulates attached to the filter 34 will combust at around a temperature of 600° C. Various methods are used to achieve this temperature to cause the particles to combust or burn and remove the obstruction to the filter.

Although many other forms of regeneration may be employed, the system illustrated in FIG. 1 utilizes a diesel oxidization catalyst 36 upstream of the diesel particulate filter. The diesel oxidization catalyst is used in combination with a nozzle 38 that sprays into the exhaust line 30 an appropriate quantity of fuel which interacts with the diesel oxidization catalyst to increase the temperature of the exhaust gases to the point where the particles will combust. Fuel nozzle 38 is supplied with the appropriate quantity of fuel from a fuel metering system generally indicated by reference character 40. Fuel metering system 40 receives a supply of fuel from an appropriate source via line 42. It should be noted that typically the source for fuel in line 42 would be the fuel control for the internal combustion engine 12. A return line 44 returns fuel not passing through nozzle 38 to an appropriate fuel supply. A check valve 46 provides fuel flow only into a metering device 48 from supply line 42. A pressure sensor 50 is used to control the flow to the fuel nozzle 38. A T connection 52 is positioned downstream of the metering device 48. The metering device 48 is actuated to supply the appropriate quantity of fuel through nozzle 38 at the appropriate time in the engine duty cycle to increase the exhaust temperature past the DOC to increase temperatures to the point where the particles combust.

The nozzle 38 and line 54 are exposed to temperatures prevailing within the exhaust line 30. These temperatures, during operation, can reach levels at which any residual fuel in nozzle 38 and line 54 can coke and impair operation of the system. In order to prevent such an occurrence, an air supply line 56 is connected between the T connection 52 and sir tank 62. A solenoid valve 58 in line 56 provides control and a check valve 60 permits air flow only towards T connection 52. Line 56 extends to the tank 62 having a capacity suitable for normal operation of the purging process described below.

Air tank 62 is connected to the output of the compressor 18 in the turbocharger 12 by a line 64 extending to the intercooler 26 output line 28. A check valve 66 in line 64 permits flow only into the air tank 62 and a metering orifice 68 limits the quantity and rate of air so entered into air tank 62. As herein shown, the pressure input to air tank 62 is downstream of intercooler 26. However, it may alternately be connected to an upstream section via a line 70 illustrated in dashed fashion. An additional solenoid valve 72 is provided in fuel return line 44 to complete the elements of the regeneration system.

During operation of engine 10, particles passing through exhaust line 30 are collected on the diesel particulate filter 34. Through appropriate pressure differential sensors (not shown), the system is triggered to regenerate the filter 34 by increasing exhaust temperature. At this point, fuel is delivered via line 42 through the fuel metering device 48 and the appropriate quantity of fuel is injected into the exhaust line 30 via nozzle 38. The fuel interacts with the DOC to cause an elevation of the temperature within the aftertreatment device 32 to a level where the particulates combust.

When regeneration of the DOC is complete, the T connection 52 is connected to the air tank 62 by opening solenoid valve 58 and the return line solenoid 72 is closed to prevent air flow through fuel return line 44. In this position, air is delivered from tank 62 through line 56 and 54 and nozzle 38 to effectively completely purge line 54 and nozzle 38. At the same time, check valve 46 prevents air flow back into the fuel supply line 46. This minimizes any fuel that is residing in the fuel line or nozzle to minimize coking. Although solenoid and check valves are illustrated to control the air and confine it substantially to the nozzle 38 and fuel line 54, it should be apparent to those skilled in the art that other arrangements may be employed, such as a three way vale in place of the T connection 52.

By utilizing bleed air from the engine intake pressurization system, the need for a dedicated air pressurizing pump is eliminated. The orifice 68 limits the quantity of air flow from the engine operating system to have a negligible affect on engine performance. It has been found that no more than 5% flow is needed to supply the air tank under normal operating conditions. It has also been found that an air pressure level significantly lower than heretofore proposed is adequate and appropriate for purging line 54 and nozzle 38. Pressure levels as low as 30 psi may be employed for this purpose since pressures existing in the exhaust line are no greater than 5 psi, even under extreme conditions.

The use of simple check valves and solenoid valves enable the efficient purging of the fuel line and nozzle without the use of complex diversion valves. Check valves and solenoid valves are relatively inexpensive but extremely reliable in service.

Having described the preferred embodiment, it will become apparent that various modifications can be made without departing from the scope of the invention as defined in the accompanying claims.

The invention claimed is:

1. An internal combustion engine system comprising:
   an internal combustion engine having an intake for air and an exhaust for products of combustion;
   a device for pressurizing intake air for delivery to said engine for combustion;
   an intercooler interposed between said pressurizing device and said engine intake for cooling air and, wherein said system for purging said fuel line receives air from one of a point downstream of said intercooler and from a point upstream of said intercooler,
   an exhaust aftertreatment device receiving the exhaust from said engine;
   a device for regenerating said exhaust aftertreatment device, said regenerating device having a fuel line and nozzle for injecting fuel upstream of said exhaust aftertreatment device on a periodic basis;
   a system for purging said fuel line and said nozzle with air from said intake air pressurizing device when said regenerating device is not injecting fuel, said system for purging said fuel line having an air reservoir receiving air from said pressurizing device and an outlet extending to said fuel line and nozzle and connected to said fuel line and nozzle when fuel is not being injected; and
   an orifice between said reservoir and said pressurizing device for limiting the flow of air from said pressurizing device.

2. The internal combustion engine system as claimed in claim 1, wherein said pressurizing device is a turbo supercharger.

3. The internal combustion engine system as claimed in claim 1, further comprising a check valve between said reservoir and said pressurizing device for permitting air only into said reservoir from said pressurizing device.

4. The internal combustion engine system as claimed in claim 3, further comprising a check valve between said reservoir and said fuel line and nozzle for permitting air only toward said fuel line and said nozzle.

5. An internal combustion engine system comprising:
   an internal combustion engine having an intake for air and an exhaust for products of combustion;
   a device for pressurizing intake air for delivery to said engine for combustion;
   an exhaust aftertreatment device receiving the exhaust from said engine;
   a device for regenerating said exhaust aftertreatment device, said regenerating device having a fuel line and nozzle for injecting fuel upstream of said exhaust aftertreatment device on a periodic basis;
   a system for purging said fuel line and said nozzle with air from said intake air pressurizing device when said regenerating device is not injecting fuel, said system for purging said fuel line having an air reservoir receiving air from said pressurizing device and an outlet extending to said fuel line and nozzle and connected to said fuel line and nozzle when fuel is not being injected;

an orifice between said reservoir and said pressurizing device for limiting the flow of air from said pressurizing device; and a fuel metering device positioned away from said exhaust, said fuel metering device receiving a supply of pressurized fuel and connected to said fuel line and nozzle and having a return line for fuel not used by said nozzle and a connection positioned downstream of said fuel metering device for permitting air from said pressurizing device to said fuel line and nozzle.

6. The internal combustion engine system as claimed in claim 5, further comprising a control device for selectively permitting fuel flow to said nozzle and air to said nozzle.

7. The internal combustion engine system as claimed in claim 6, wherein said control device comprises solenoid valves for controlling fuel to said fuel line and air to said fuel line.

8. The internal combustion engine system as claimed in claim 7, wherein said control device further comprises check valves for respectively permitting fuel flow only to said metering device and permitting air flow only toward said fuel line from said engine pressurizing device.

9. The internal combustion engine system as claimed in claim 8, wherein said solenoid valves are respectively between said engine pressurizing device and said fuel line and in said fuel return line.

10. The internal combustion engine system as claimed in claim 1, wherein the air pressure for purging said line is as low as 30 pounds per square inch (psi).

* * * * *